United States Patent [19]

Rosenquist

[11] Patent Number: 4,933,424
[45] Date of Patent: Jun. 12, 1990

[54] HYDROXY TERMINATED POLYCARBONATE FROM HYDROXY BENZENE ALKANOL

[75] Inventor: Niles R. Rosenquist, Evansville, Ind.

[73] Assignee: General Electric Company, Mt. Vernon, Ind.

[21] Appl. No.: 292,136

[22] Filed: Dec. 30, 1988

[51] Int. Cl.$^5$ .............................................. C08G 63/62
[52] U.S. Cl. .................................. 528/198; 525/462; 528/176; 528/179; 528/196
[58] Field of Search ................ 528/198, 196; 525/462

[56] References Cited

U.S. PATENT DOCUMENTS 4,732,934  3/1988  Hathaway et al. .................. 528/196
4,774,315  9/1988  Miller ................................... 528/198

*Primary Examiner*—Harold D. Anderson
*Attorney, Agent, or Firm*—Martin Barancik; Joseph Eisele

[57] ABSTRACT

A method for the preparation of aromatic polycarbonate resins bearing terminal hydroxy groups comprises the interfacial polymerization of a dihydric phenol with a carbonyl halide in the presence of a molecular weight controlling proportion of a compound of the formula:

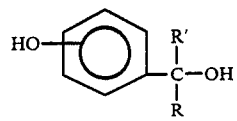

wherein R and R' each independently represent hydrogen and hydrocarbyl of 1 to about 12 carbons; or R and R' when taken together with the carbon atom between them represent cycloalkyl of 3 to 8 carbon atoms, inclusive. The novel product resins are useful as intermediates in the preparation of copolymers with, for example, polyesteramides and as cross-linking agents, to cross-link polycarbonates and like resins.

5 Claims, No Drawings

HYDROXY TERMINATED POLYCARBONATE FROM HYDROXY BENZENE ALKANOL

BACKGROUND OF THE INVENTION
1. Field of The Invention

The invention relates to polycarbonate resins and more particularly to polycarbonate resins with a polymer chain terminated by a moiety containing a hydroxyl group, their method of preparation and use.

2. Brief Description of the Prior Art

Although not prior art to the present invention, hydroxyl polycarbonate resins and their method of preparation are described in the now copending U.S. patent application Ser. No. 939,391 filed on Dec. 8, 1986, now U.S. Pat. No. 4,732,934, by Pyles, Longely and Hathaway. The method of preparation entails the use of a mono protected bishydroxyl compound such as shown in the formula:

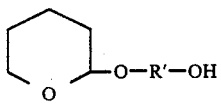

wherein R' represents alkylene or arylene, as the chain terminating agent in the preparation of the resins, followed by removal of the protecting group to generate a hydroxyl-terminated polycarbonate resin.

These hydroxy terminated resins were subsequently converted via reaction at the hydroxy group to reactive end group resins useful in polymer blend and copolymer preparation.

Other hydroxyl-terminated polycarbonates were also known prior to the present invention. However, hydroxyl group terminated polycarbonate resins are generally difficult to prepare, especially when made directly in the convenient and well known interfacial polymerization reaction. The difficulty arises because conventionally in this technique it is most convenient to react an equivalent excess of carbonyl halide with a bisphenol and a mono-functional chain terminating agent. However, to produce hydroxyl terminated resin directly in this process, the chain terminating agent would be deleted and slightly less than an equivalent of carbonyl halide would be needed. Because of difficulties of controlling carbonyl halide addition rates and of controlling its losses to side reactions and volatilization, this leads to difficulties in controlling the hydroxyl end group levels and the resin molecular weight.

The method of the present invention permits one to prepare polycarbonate resins having hydroxyl terminal groups, from an interfacial polymerization. The polymers obtained have end group structures which are useful to prepare polycarbonate copolymers with properties useful in thermoplastically molded articles. The polycarbonate resins of the invention are also useful as precursors to cross-linked polycarbonate resins. The cross-linked resins may be characterized- in-part by an enhanced non-dripping property when exposed to high temperature or open flame.

SUMMARY OF THE INVENTION

The invention comprises a method of preparing a polycarbonate resin having polymer chains terminated with a hydroxyl group, which comprises;

reacting a dihydric phenol with a carbonyl halide under interfacial polymerization conditions, in the presence of a molecular weight controlling proportion of a compound of the formula:

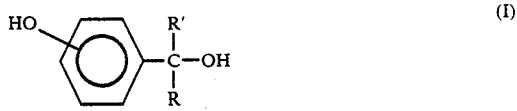

wherein R and R' each independently represent hydrogen or hydrocarbyl of 1 to about 12 carbon atoms, inclusive; or when taken together with the carbon atom between them represent cycloalkyl of 3 to 8 carbon atoms, inclusive. The term "hydrocarbyl" is used herein to mean a monovalent moiety obtained by removal of a hydrogen atom from a parent hydrocarbon, both branched and linear. Representative of hydrocarbyl are alkyl of 1 to 12 carbon atoms, inclusive, such as methyl, ethyl, propyl, butyl, pentyl, hexyl, heptyl, octyl, nonyl, undecyl, decyl, dodecyl, and the isomeric forms thereof; aryl of 6 to 12 carbon atoms, inclusive, such as phenyl, tolyl, xylyl, napthyl, biphenyl, and the like; aralkyl of 7 to 12 carbon atoms, inclusive, such as benzyl, phenethyl, phenpropyl, phenbutyl, phenhexyl and the like; cycloalkyl of 3 to 8 carbon atoms, inclusive, such as cyclopropyl, cyclobutyl, cyclopentyl, cyclohexyl, cycloheptyl, cyclooctyl and the like.

DETAILED DESCRIPTION OF THE PREFERRED EMBODIMENTS OF THE INVENTION

Polycarbonate resins and their method of preparation by interfacial polymerization are well known; see for example the details provided in the U.S. Pat. Nos. 3,028,365; 3,334,154; 3,275,601; 3,915,926; 3,030,331; 3,169,121; 3,027,814; and 4,188,314, all of which are incorporated herein by reference thereto.

In general, the method of interfacial polymerization comprises the reaction of a dihydric phenol with a carbonyl halide (the carbonate precursor).

Although the reaction conditions of the preparitive processes may vary, several of the preferred processes typically involve dissolving or dispersing the diphenol reactants in aqueous caustic, adding the resulting mixture to a suitable water immiscible solvent medium and contacting the reactants with the carbonate precursor, such as phosgene, in the presence of a suitable catalyst and under controlled pH conditions. The most commonly used water immiscible solvents include methylene chloride, 1,1-dichloroethane, chlorobenzene, toluene, and the like.

The catalyst employed accelerates the rate of polymerization of the dihydric phenol reactant with the carbonate precursor. Representative catalysts include but are not limited to tertiary amines such as triethylamine, quaternary phosphonium compounds, quaternary ammonium compounds, and the like. The preferred process for preparing polycarbonate resins of the invention comprises a phosgenation reaction. The temperature at which the phosgenation reaction proceeds may vary from below 0° C., to above 100° C. The phosgenation reaction preferably proceeds at temperatures of from room temperatures (25° C.) to 50° C. Since the reaction is exothermic, the rate of phosgene addition may be used to control the reaction temperature. The amount of phosgene required will generally depend upon the amount of the dihydric phenol and the amount of any dicarboxylic acid also present.

Dihydric phenol reactants employed to prepare the polycarbonate resins of the invention are generally well known compounds as are methods of their preparation. Representative of such dihydric phenols are phenolic diols of the general formula:

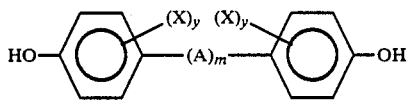
(II)

wherein A is selected from the group consisting of a divalent hydrocarbon radical containing from 1 to about 15 carbon atoms; a halogen substituted divalent hydrocarbon radical containing from 1 to about 15 carbon atoms and divalent groups such as:

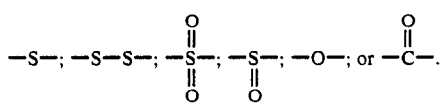

Each X in formula (II) is independently selected from the group consisting of halogen, hydrocarbyl such as an alkyl group of from 1 to about 8 carbon atoms; an aryl group of from 6–18 carbon atoms, an aralkyl group of from 7 to about 14 carbon atoms, an oxyalkyl group of from 1 to about 8 carbon atoms, and an oxyaryl group of from 6 to 19 carbon atoms; and wherein m is zero or 1 and y is a whole number integer of from 0 to 4, inclusive.

Typical of some of the dihydric phenols that are advantageously employed are bis-phenols such as bis(4-hydroxyphenyl) methane, 2,2-bis(4-hydroxy-3-methylphenyl)propane, 4,4-bis(4-hydroxyphenyl)heptane, 2,2-bis(4-hydroxy-3,5-dichlorophenyl)propane, 2,2-bis(4-hydroxy-3,5-dibromophenyl)propane; dihydric phenyl ethers such as bis(4-hydroxphenyl)ether, bis(3,5-dichloro-4-hydroxyphenyl)ether; dihydroxybiphenyls such as p,p'-dihydroxybiphenyl, 3,3'-dichloro-4,4'-dihydroxybiphenyl; dihydroxyaryl sulfones such as bis(4-hydroxyphenyl) sulfone, dihydroxy benzenes such as resorcinol and hydroquinone, halo- and alkyl-substituted dyhydroxy benzenes such as 1,4-dihydroxy-2,5-dichlorobenzene, 1,4-dihydroxy-3-methylbenzene; and dihydroxy biphenyl sulfides and sulfoxides such as bis(4-hydroxyphenyl)sulfide and bis(4-hydroxyphenyl)-sulfoxide. A variety of additional dihydric phenols are also available and are disclosed in U.S. Pat. Nos. 2,999,835; 3,028,365 and 3,153,008, all of which are incorporated herein by reference. It is, of course, possible to employ two or more different dihydric phenols or a combination of a dihydric phenol with a glycol.

Preferred dihydric phenols of Formula (II) are the 4,4'-bisphenols.

The carbonate precursor employed in the preparation of resins of the present invention may be a carbonyl halide, a diarylcarbonate, or a bishaloformate. The carbonyl halides include carbonyl bromide, carbonyl chloride, and mixtures thereof. The bishaloformates include the bishaloformates of dihydric phenols such as bischloroformates of 2,3-bis(4-hydroxyphenyl)propane, hydroquinone, and the like; or the bischloroformates of glycols such as the bischloroformates of ethylene glycol, neopentylene glycol, polyethylene glycol, and the like. Typical of the diarylcarbonates which may be employed are diphenyl carbonate, and the di(alkylphenyl)-carbonates such as di(tolyl) carbonate. Some other non-limiting illustrative examples of suitable diarylcarbonates include di(napthyl)carbonate, phenyl tolyl carbonate, and the like.

The preferred carbonate precursors are the carbonyl halides, with carbonyl chloride, also know as phosgene, being the preferred carbonyl halide.

The term "polycarbonate" as used herein is inclusive of copolyester-polycarbonates, i.e.; resins which contain, in addition to recurring polycarbonate chain units of the formula:

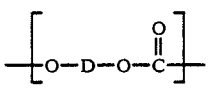

wherein D is a divalent aromatic radical of the dihydric phenol employed in the polymerization reaction, repeating or recurring carboxylate units, for example of the formula:

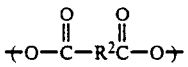

wherein $R^2$ is as defined below.

The copolyester-polycarbonate resins are also prepared by interfacial polymerization technique, well known to those skilled in the art; see for example the U.S. Pat. Nos. 3,169,121 and 4,487,896.

In general the copolyester-polycarbonate resins are prepared as described above for the preparation of polycarbonate homopolymers, but by the added presence of a difunctional carboxylic acid (ester precursor) in the water immiscible solvent.

In general, any difunctional carboxylic acid (dicarboxylic acid) conventionally used in the preparation of linear polyesters may be utilized in the preparation of the copolyester-carbonate resins of the instant invention. Generally, the difunctional carboxylic acids which may be utilized include the aliphatic carboxylic acids, the aromatic carboxylic acids, and the aliphatic-aromatic carboxylic acids. These acids are well known and are disclosed for example in U.S. Pat. No. 3,169,121, which is hereby incorporated herein by reference. Representative of such difunctional carboxylic acids are difunctional carboxylic acids of the formula:

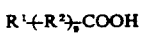
(III)

wherein $R^2$ is an alkylene, alkylidene, or cycloaliphatic group; an alkylene, alkylidene or cycloaliphatic group containing ethylenic unsaturation; an aromatic group such as phenylene, biphenylene, and the like; two or more aromatic groups connected through non-aromatic linkages such as alkylene or alkylidene groups; and a divalent aralkyl radical such as tolylene, xylylene, and the like. $R^1$ is either a carboxyl or a hydroxyl group. The letter q represents one where $R^1$ is a hydroxyl group and either zero or one where $R^1$ is a carboxyl group.

Preferred difunctional carboxylic acids employed are the aromatic dicarboxylic acids. particularly useful aromatic dicarboxylic acids are those represented by the general formula:

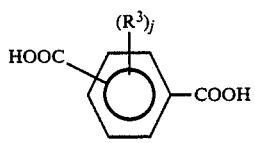

wherein j is a positive whole integer having a value of from 0 to 4 inclusive; and each $R^3$ is independently selected from the group consisting of alkyl radicals, preferably lower alkyl radicals (containing from 1 to about 5 carbon atoms).

Mixtures of these difunctional carboxylic acids may be employed as well as single acids. Therefore, where the term difunctional carboxylic acid is used herein it is to be understood that this term includes mixtures of two or more different difunctional carboxylic acids as well as individual carboxylic acids.

Most preferred as aromatic dicarboxylic acids are isophthalic acid, terephthalic acid, and mixtures thereof. A particularly useful difunctional carboxylic acid comprises a mixture of isophthalic acid and terephthalic acid wherein the weight ratio of terephthalic acid to isophthalic acid is in the range of from about 10:1 to about 0.2:9 8.

Rather than utilizing the difunctional carboxylic acid per se, it is possible, and sometimes even preferred, to employ the reactive derivatives of said acid. Illustrative of these reactive derivatives are the acid halides. The preferred acid halides are the acid dichlorides and the acid dibromides. Thus, for example, instead of using isophthalic acid, terephthalic acid or mixtures thereof, it is possible to employ isophthaloyl dichloride, terephthaloyl dichloride, and mixtures thereof.

The proportions of reactants employed to prepare the copolyester-carbonate resins of the invention will vary in accordance with the proposed use of the product resin. Those skilled in the art are aware of useful proportions, as described in the U.S. patents referred to above. In general, the amount of the ester bonds may be from about 5 to about 90 mole percent, preferably from about 35 to about 80 mole percent, relative to the carbonate bonds. For example, 5 moles of bisphenol-A reacting completely with 4 moles of isophthaloyl dichloride and 1 mole of phosgene would give a copolyester-carbonate of 80 mole percent ester bonds.

Also included within the scope of the instant invention are randomly branched polycarbonate resins wherein a minor amount (typically between 0.05 and 2 mole percent, based on the quantity of dihydric phenol used) of a polyfunctional aromatic compound is a coreactant with the dihydric phenol in the reaction mixture, comprising also the carbonate precursor and optionally the ester precursor; to provide a thermoplastic randomly branched polycarbonate. These polyfunctional aromatic compounds may be hydroxyl, carboxyl, carboxylic anhydride, haloformyl, or mixtures thereof. Some illustrative non-limiting examples of these polyfunctional compounds include trimellitic anhydride, trimellitic acid, trimellityl trichloride, 4-chloroformyl phthalic anhydride, pyromellitic acid, pyromellitic dianhydride, mellitic acid, mellitic anyhdride, trimesic acid, benzophenonetetracarboxylic acid, benzophenonetetracarboxylic acid anhydride, and the like. Other organic polyfunctional compounds useful in making randomly branched polycarbonates are disclosed in U.S. Pat. Nos. 3,635.895 and 4,001,184, both of which are incorporated herein by reference.

In the conventional interfacial polymerization methods of preparing polycarbonates, a molecular weight regulator (a chain stopper) is generally added to the reaction mixture prior to or during the contacting with a carbonate precursor. Useful molecular weight regulators include, but are not limited to, monohydric phenols such as phenol, chroman-I, paratertiarybutylphenyl, p-cumylphenol and the like. Techniques for the control of molecular weight are well known in the art and are used for controlling the molecular weight of the resins of the present invention.

The method of the present invention departs from the conventional interfacial polymerization methods for preparing polycarbonates by the use of a novel chain stopper. Employed as the sole chain stopper, or in combination with one or more of the aforementioned known chain stoppers is a compound of the formula (I) given above. The hydroxyl group attached directly to the phenyl ring is the hydroxyl group which reacts to end cap the resin chain, leaving the aliphatic hydroxyl unreacted and free for further reactions.

The proportion of compound (I) added to the reaction mixture may vary but is generally within the range of from 0.5 to 25 mole percent of the dihydric phenol reactant of formula (II).

The compounds of the formula (I) are generally well known as are methods of their preparation. General methods comprise reduction of appropriate aryl ketones via reaction with, for example alkyl Grignard reagents or sodium borohydride.

Those skilled in the art will appreciate from the description given above, that the polycarbonate resins of the present invention may be represented by the schematic formula:

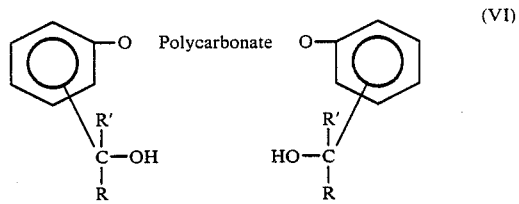

wherein R and R' have the meaning previously ascribed to them. The end-capped polycarbonate resins of the formula (VI) are useful intermediates for the preparation of polycarbonate block copolymers, with reactive polymers such as polyesters, polyester-amides, polyphenylene sulfides, polyphenylene ethers and the like. The resins of formula (VI) will also function as cross-linkers to cross-link themselves or other reactive resins, such as other polycarbonate resins, when exposed to temperatures within the range of from about 100° C. to about 350° C. Under these conditions, the terminal hydroxyl groups function as cross-linking sites. This is believed to occur through loss of the hydroxy group, resulting in formation of reactive ionic, radical and/or olefinic species, depending on the nature of R and R', and subsequent reaction of these species.

The cross-linked polycarbonate resin product compositions of the invention may exhibit improvements in certain physical properties of molded articles such as heat resistance, solvent resistance, thermal creep resistance, flame resistance and drip retardancy, compared to the precursor uncross-linked polycarbonate resins.

The polycarbonate resins (VI) of the invention described above may have a weight average molecular weight of from about 10,000 to about 200,000, preferably from about 30,000 to about 150,000 and an intrinsic viscosity, as measured in methylene chloride at 25° C., of at least about 0.3 dl/gm, preferably from about 0.45 to about 1.40 dl/gm.

The following examples and preparations describe the manner and process of making and using the invention and set forth the best mode contemplated by the inventor of carrying out the invention but are not to be construed as limiting the invention. where reported, the following tests were carried out:

Intrinsic Viscosity

The intrinsic viscosity was measured at a temperature of 25° C. in methylene chloride and is reported in deciliters/gram (dl/g).

Degree of Cross-Linking (gel formation); Gel Analysis

Five gram samples of the resin powder were placed in petri dishes pre-treated with a silicone-based mold release agent, and the dishes placed in a 300° C./3 mm vacuum oven for either ½ or one hour. Only two samples were heat treated at one time and they were placed side-by-side in identical positions in the oven in order to avoid possible variability in the Test temperature due to non-uniformity of temperature within the oven.

Two gram samples of each heat treated resin were allowed to stand in 150 ml methylene chloride for at least 24 hours. Any gels that formed were then separated from the solution, and the solvent removed to provide a sample of the soluble resin for IV analysis. When substantial amounts of gels were present, they were then extracted three more times with 150 ml portions of methylene chloride, with the samples being allowed to stand at least 24 hours, 24 hours and 3 hours respectively. After the third and fourth extractions the samples were dried and weighed, and in all cases were found to show no additional loss in weight on the fourth extraction. The percent of gel is the residual weight divided by the original weight of the heat-aged material, multiplied by 100.

EXAMPLE 1 (Comparative Example)

This example is not an example of the invention but is made for comparative purposes.

A 3000 ml four neck flask is fitted with a mechanical stirrer, a pH probe, an aqueous caustic inlet tube and a Claisen adaptor to which is attached a dry ice condenser and a gas inlet tube. To the flask is added 560 ml water, 680 ml methylene chloride, 2.8 ml triethylamine (0.02 mole), 1.65 g (0.0175 mole, 3.5 mole %) phenol and 114 g (0.50 mole) bisphenol-A. With stirring the pH is raised to 10 by addition of 25% aqueous sodium hydroxide, then phosgene is introduced into the flask at 1 g/min for 60 minutes (0.6 mole) with pH maintained at 9.5 to 11.5. The pH is adjusted to 11 at the end of the reaction. The resin layer is separated from the brine layer, washed with 3 wt. % aqueous HCl until washing remained acidic then twice with distilled water. The resin is then precipitated into 3000 ml of methanol in a Waring blender, then washed with additional methanol and dried.

The intrinsic viscosity (IV) and percent of gels is set forth in Table 1, below.

EXAMPLE 2

The procedure of Example 1, supra., is repeated except that for the end-capping agent, the phenol was replaced with 2.48 g (0.02 mole, 4.0 mole %) of 4-hydroxybenzenemethanol (structure of formula I, wherein $R=R'=H$). The resulting resin, when subjected to thermolysis at a temperature of 300° C. under a vacuum of 3 mm Hg for varying periods of time, exhibits increasing intrinsic values and gel formation. The intrinsic viscosity (IV) and percent of gels observed for the product resin are set forth in the Table 1, below.

EXAMPLE 3

Substantially the same procedure as in Example 2 was used except that as end capping agent 4.0 mole % of 4-hydroxy-α-methylbenzenemethanol (Structure of Formula I; $R=H$, $R'=CH_3$) was used. Testing was as for Example 2, supra.

EXAMPLE 4

Substantially the same procedure as in example 2 was used except that as end capping agent 4.0 mole % of 4-hydroxy-α,α-dimethylbenzenemethanol (Structure of Formula I; $R=R'=CH_3$) was used. Testing was as for Example 2, supra.

EXAMPLE 5

Substantially the same procedure as in Example 2 was used except that as the end capping agent 3.5 mole % of 4-hydroxy-α-phenylbenzenemethanol (Structure of Formula I, $R=H$, $R'=C_6H_5$) was used. Testing was as for Example 2, supra.

TABLE I

| Example No. | End Cap Structure [1] R | R' | Initial Resin IV | 30 min. at 300° C. IV [2] | % gels | 60 min. at 300° C. IV [2] | % gels |
|---|---|---|---|---|---|---|---|
| 1 (control) | —[3] | — | 0.472 | 0.522 | 0% | 0.540 | 0% |
| 2 | H | H | 0.559 | 0.797 | 0% | 0.746 | 48% |
| 3 | H | CH$_3$ | 0.461 | 0.445 | 0% | 0.574 | 0%[4] |
| 4 | CH$_3$ | CH$_3$ | 0.508 | 0.386 | 0% | 0.423 | 1%[5] |
| 5 | H | C$_6$H$_5$ | 0.451 | 0.715 | 37%[6] | 0.690 | 54%[6] |

[1] End Capping agents with structures

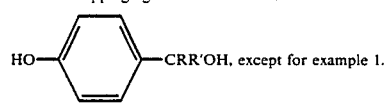

HO—⟨benzene ring⟩—CRR'OH, except for example 1.

[2] IV of the soluble portion after extraction of the gels.
[3] Control, with phenol as end-capping agent.
[4] Trace of gels observed, too low to measure by technique used.
[5] Results for resins of Example 4 were highly variable and in some cases resulted in gels.
[6] Sample after aging was deep red in color (other samples for examples 1 to 4 were yellow).

What is claimed is:

1. A method of preparing a hydroxy group chainterminated aromatic polycarbonate resin, which comprises;

reacting a dihydric phenol with a carbonyl halide under interfacial polymerization conditions, in the presence of a molecular weight controlling proportion of a compound of the formula:

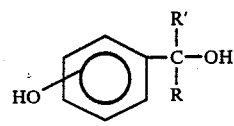

wherein R and R' each independently represent hydrogen or hydrocarbyl of 1 to about 12 carbon atoms, inclusive; or when taken together with the carbon atom between them, R and R' represent cycloalkyl of 3 to 8 carbon atoms, inclusive.

2. The method of claim 1 wherein the dihydric phenol is selected from those of the formula:

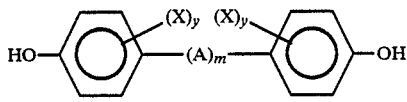

wherein A is selected from the group consisting of a divalent hydrocarbon radical containing from 1 to about 15 carbon atoms; a halogen substituted divalent hydrocarbon radical containing from 1 to about 15 carbon atoms and divalent groups selected from:

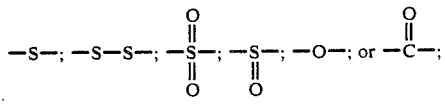

wherein each X is independently selected from the group consisting of a halogen, hydrocarbyl, oxyalkyl or oxyaryl and wherein m is zero or 1 and y is a whole number integer of from 0 to 4, inclusive.

3. The method of claim 2 wherein the carbonyl halide is phosgene.

4. An aromatic polycarbonate resin end-capped with a monovalent moiety of the formula:

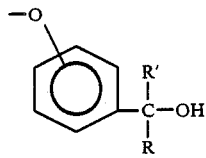

wherein R and R' each independently represent hydrogen or hydrocarbyl of 1 to about 12 carbon atoms, inclusive; or R and R' when taken together with the carbon atom between them, represent cycloalkyl of 3 to 8 carbon atoms, inclusive.

5. An aromatic polycarbonate of the formula:

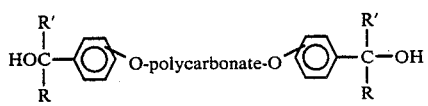

wherein R and R' are each independently hydrogen or hydrocarbyl of one to about twelve carbon atoms, inclusive; or R and R' when taken together with the carbon atom between them, represent cycloalkyl of 3 to 8 carbon atoms, inclusive.

* * * * *